Jan. 14, 1958  J. POLARD ET AL  2,819,514
METHOD OF FITTING CLOSING CHANNELS IN
STATOR SLOTS OF ELECTRICAL MACHINES
Filed July 10, 1953

United States Patent Office 2,819,514
Patented Jan. 14, 1958

2,819,514

METHOD OF FITTING CLOSING CHANNELS IN STATOR SLOTS OF ELECTRICAL MACHINES

Jean Polard, Saint-Germain-en-Laye, and René Herbrecht, Paris, France, assignors to Societe Anonyme dite: Compagnie Electro-Mecanique, Paris, France Application July 10, 1953, Serial No. 367,278

Claims priority, application France November 13, 1952

2 Claims. (Cl. 29—155.58)

In the U. S. Patent No. 2,506,173 of November 4, 1948, a method is described whereby the stator windings of electrical machines can be wound in position in a much shorter time than with hitherto known methods.

Now this invention makes it possible to further reduce this winding time.

The novel method according to this invention is characterized in that the stator slots are closed by means of a single channel member instead of a channel member plus a wedge member, and in that these channel members are first positioned in the slots of the dummy rotor and then transferred into the stator slots, together with the wires of the stator winding.

This transfer operation and the simultaneous formation of the winding heads provide not only a substantial reduction of the winding time but also the additional advantage of a more convenient utilization of the material.

The following description made with reference to the attached diagrammatical drawings will afford a better understanding of the method of this invention and of the means by which the same can be carried out in the practice. In the drawings and by way of example only:

Figure 1:
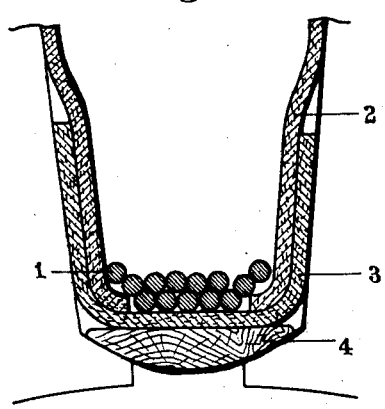
Figure 1 is a fragmentary cross-sectional view showing the conventional method of closing stator slots according to the hand-winding practice.

Referring first to Fig. 1, it is obvious that in this conventional method, as the coils are inserted by hand and one by one into the slots, a slot wedge 4 must be introduced laterally between the longitudinal bottom edges of the slot and the coil wires to prevent the latter from passing through the slot. To avoid damaging the wires during this introduction, each slot is generally closed through a two-step operation. In the first step, an insulating sheet 3 of relatively reduced strength is slipped between the slot edges and the wires, and preferably between the core and the slot lining 2.

When all the stator winding coils are thus positioned, the second step of the operation is carried out by clamping the coil wires in the stator slot by using a suitably shaped wedge member 4 of wood or pressed cardboard. As these wedge members 4 engage the insulator 3 when they are slipped in, they can be forced to their final position without any risk of damaging the coil wires. However, these wedge members must have a minimum mechanical strength to withstand this operation, which means a relative thickness thereof and therefore a loss of useful cooper volume in the most detrimental place, with consequent increase in the leakage flux. In addition to their coil-supporting rôle under operating conditions, these wedge members make it possible to apply the necessary force (generally by moderate hammering) onto the coils for bringing same to the desired shape.

Figure 2:
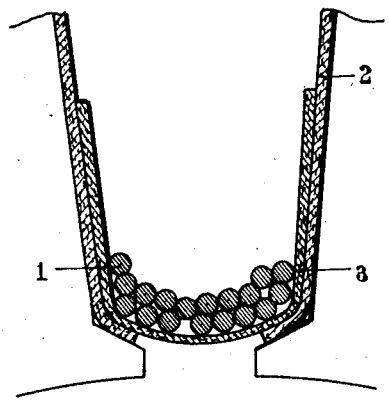
Figure 2 is a view similar to Fig. 1 but illustrating the novel method of this invention.
Figure 3:
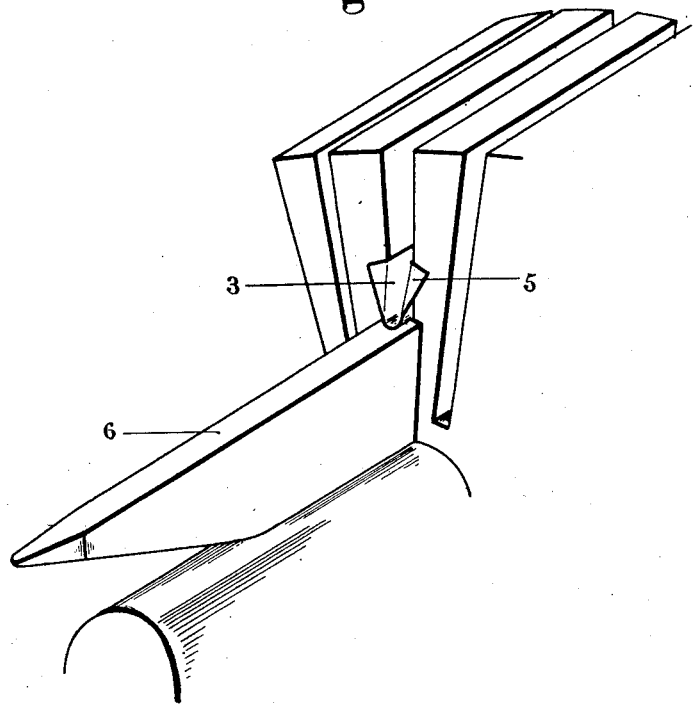
Figure 3 shows in perspective fragmentary view the wedge-rod of a stator, positioned in the slot of a dummy rotor prior to its transfer to the corresponding stator slot.

Referring now to Fig. 2, it will be seen that in this specific example of a practical application of the method of this invention the channel member 3 for closing the stator slot is positioned in the corresponding notch of the dummy rotor and engaged by the driver-rod 6, before the coils are introduced into this notch; the longitudinal and transverse dimensions of this channel member are of course adequately selected. As shown in Fig. 3, this channel member, made for instance of Leatheroid (a proprietary vulcanised fibre), is given a slightly splayed shape for example by bending its edges 5 towards the core at the end of the dummy rotor. Then the various coils are introduced into the dummy rotor and during the operation consisting in transferring the winding from the dummy rotor to the stator slots, these channel members 3 are simultaneously introduced into the corresponding slots together with the coil wires.

This is clearly shown in Fig. 2 of the drawings. As the formation of the coil heads is obtained by the comb action taking place as the driver-rods exert their maximum pressure against the wires introduced into the stator notches, it is no more necessary to hold these channel members 3 by means of an additional wedge member 4 as required in hand-winding methods for permitting the formation of winding heads, and therefore these wedge members may be dispensed with. Thus, from 1/8" to 1/4" can be gained on the slot height available, the essential advantage of this gain being that it is obtained in the most favourable place, that is in the narrowest location of the stator notch, whereby the leakage flux and therefore the reactive power absorbed by the motor will be reduced accordingly.

What we claim is:

1. A method for inserting coils in the slots of the stator of an electrical machine by means of a dummy rotor having corresponding slots formed around its periphery, said slots being at least as small at their outer edges as the outer edges of the stator slots, consisting in placing a driver-rod in the bottom of each slot of the dummy rotor, in placing on each driver-rod in each said slot a channel member with its open side facing towards the outer edge of said slot, said channel member being of such rigid and resilient material as to enable it to spring outwardly against the slots walls, in lodging the coils in said channel member, in placing the said dummy rotor inside the stator bore with the slots of said rotor in radial alignment with the slots of said stator and in transferring the channel members and the windings from the slots of the dummy rotor in the slots of the stator by means of a radial push on the driver-rods.

2. A method for inserting coils in the slots of the stator of an electrical machine according to claim 1, in which after placing the channel members in the slots of the dummy rotor and before lodging the coils in the channel members, the outer laterally projecting ends of said channel members are given a splayed shape by bending their edges towards the sides of said dummy rotor in order to guide the portions of the coils extending outwardly of the slots during the lodging of said coils in the slots of said dummy rotor and to protect said coil portions during transfer of the coils into the slots of the stator.

References Cited in the file of this patent

UNITED STATES PATENTS

| | | |
|---|---|---|
| 1,538,187 | Herrick | May 19, 1925 |
| 2,002,562 | Apple | May 28, 1935 |
| 2,180,983 | Hall | Nov. 21, 1939 |
| 2,205,822 | Poole | June 25, 1940 |
| 2,443,455 | Herman | June 15, 1948 |
| 2,506,173 | Polard | May 2, 1950 |